D. ALFVÉN.
MILKING MACHINE.
APPLICATION FILED JAN. 18, 1912.

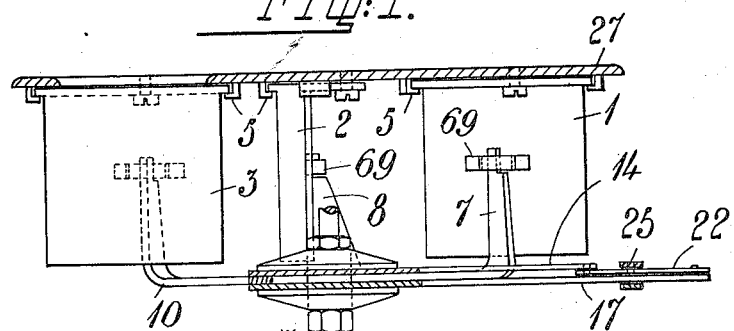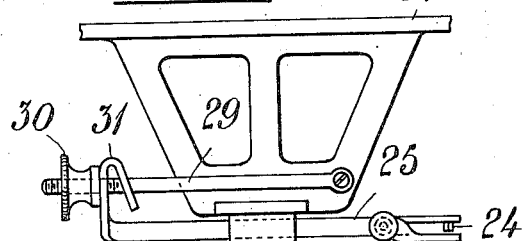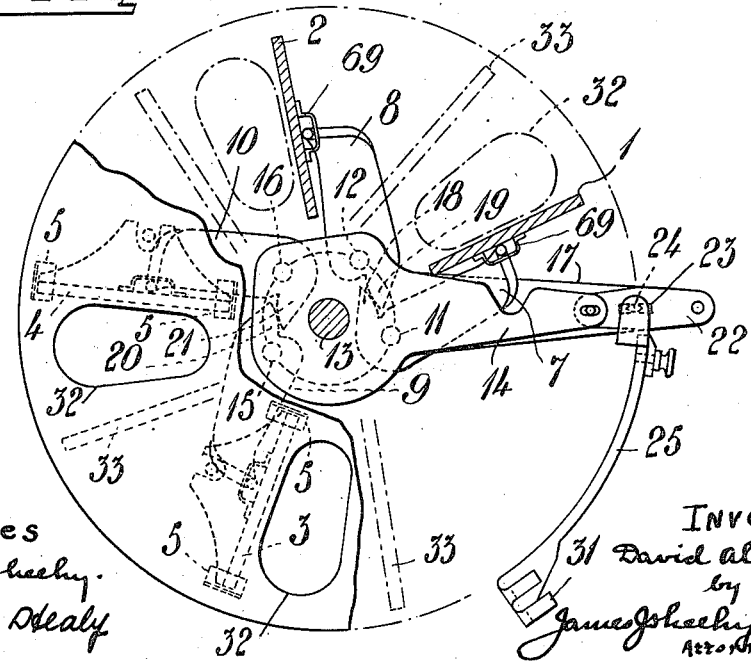

1,031,503.

Patented July 2, 1912.
2 SHEETS—SHEET 2.

Witnesses
Edna J. Sheehy
N. C. Healy

Inventor
David Alfvén
by
James J. Sheehy & Co.
Attorneys

UNITED STATES PATENT OFFICE.

DAVID ALFVÉN, OF STOCKHOLM, SWEDEN.

MILKING-MACHINE.

1,031,503.   Specification of Letters Patent.   Patented July 2, 1912.

Application filed January 18, 1912. Serial No. 671,793.

*To all whom it may concern:*

Be it known that I, DAVID ALFVÉN, a citizen of the Kingdom of Sweden, residing at Stockholm, Sweden, have invented new and useful Improvements in Milking-Machines, of which the following is a specification.

This invention relates to milking machines in which the milking members press the teats against adjustable plates. In order in such milking machines to obtain effective milking of all of the teats these plates must each be so adjusted that each teat is subjected to the most suitable pressure, a thick teat requiring to be compressed with greater pressure than a thin teat. This adjustment is difficult to effect correctly in practice and takes time. This is a disadvantage which prevents the general use of the machines in question. This disadvantage is completely avoided by the present invention in which the teat pressing plates are so arranged that they are automatically adjusted to different positions in such wise that the teats are compressed with a greater or smaller pressure according to their thickness.

The invention resides mainly in this that the teat plates are connected by a lever system in pairs after the manner of a balance with variable beam arms in which the teat plates form the scales, the pivot or pivots of the separate beam arms of the lever system being adjustable in such wise that the teat plates can be moved into and out of operative position by adjustment of these pivots. This adjustment may be effected by adjusting arms or the like which may form parts of a third balance system with variable beam arms, in which system the pivot for the beam is mounted on a movable rod or the like so that on the one hand all the teat plates can be brought at once from operative into inoperative position and vice versa and on the other hand the two pairs of teat plates can adjust themselves relatively to one another according to the different total pressures acting thereon.

In the accompanying drawing which shows a few embodiments of the invention, Figure 1 is a vertical section of a milking machine, most of the parts which form no part of the invention being omitted. Fig. 2 is a plan and part horizontal section of the same machine, several parts being omitted. Fig. 3 shows a detail. Figs. 4, 5 and 6 each show embodiments in perspective. Fig. 7 is a diagrammatic illustration of the invention.

Referring to Fig. 7 $a$ and $b$ denote two teat plates. It is assumed that these are movable at right angles to their planes in suitable guides. To each plate is pivotally secured a rod $d$ or $e$ and these rods are each pivotally connected at their ends to a balance beam $f$ which rolls on the curved face of a body $g$ secured to a rod $h$ which is adapted to be moved to and from. It is assumed that the two teats $i$ and $k$ are of different thickness and therefore ought to be compressed with different pressures. When the plates $a$ and $b$ are moved by means of the rod $h$ toward the teats $i$ and $k$ into the operative position denoted by full lines and the members $l$ and $m$ compressing the teats against the plates $a$ and $b$ move toward the teats, the thicker teat $i$ is only affected. In consequence of the resistance which this offers to compression the beam $f$ turns as denoted by dotted lines until the thinner teat $k$ is compressed between its plate and the member $m$. The swinging motion of the beam stops as soon as the pressures on the two plates balance one another. Since the pivot of the beam moves on the body $g$ during the swinging motion of the beam toward the rod $d$, which carries the plate for the thicker teat and the length of the balance arms is thus varied, the pressure on the thicker teat or on its plate is always balanced by a smaller pressure on the thinner teat or its plate. The amount of variation of the balancing arms depends on the form of the curved surface of the body $g$ and this is calculated from experiments. All the embodiments shown in the drawings are constructed on this principle.

As shown in Figs. 1 and 2 the teat plates 1, 2, 3 and 4 which are movable in guides 5 at right angles to their planes are connected in pairs with one another by means of levers 7 and 8 or 9 and 10 engaging in brackets 69 on the plates. The pivots 11 and 12 of the levers 7 and 8 are secured to a pivoted arm 14 adapted to swing, for example, about the actuating shaft 13 of the machine, while the pivots 15 and 16 of the levers 9 and 10 are secured to another arm 17 likewise adapted to swing on the shaft 13. The arms 14 and 17 are connected with one another in the manner hereinafter described. The levers 7 and 8 engage by means of teeth 18 and 19 which during the motion of the levers roll on one another so that their point of contact moves toward one or the other of the two pivots 11 and 12 according as the one or other plate is first affected. In the same manner the levers 9 and 10 engage by means of teeth 20 and 21. The outer ends of the arms 14, 17 are connected with one another by a link 22 which is provided with an extended opening 23 in which engages a pin 24 which is secured to a rod 25. This rod may be moved to and fro in a guide 26 (Fig. 3). The guide 26 is pivoted on a downwardly directed bracket 28 on the plate 27. By means of the rod 25 the two adjusting arms 14, 17 are moved to and fro as a result of which all the teat plates 1, 2, 3 and 4 can be moved at one time toward and from the teats. The link 22 acts as a balance beam since the turning movements acting during milking on the adjusting arm are transmitted to the two ends of the link. If these turning movements are unequal then the link swings about the pivot 24. Since the turning movements are unequal, if the teats of the one pair together are thicker than the teats of the other pair, and a smaller pressure on the latter ought to balance a greater pressure on the former, the pin 24 is of oval cross section so that the lengths of the arms of the balance formed by the link are varied on swinging motion of the link. To the above mentioned bracket 28 is pivotally attached an arm 29 which carries at its free end a nut 30. This arm serves to secure the rod 25 against the pressure acting on the pin 24 during milking. The rod 25 is to this end provided with a fork 31 serving to receive the arm 29 and adapted to bear against the nut 30. The plate 27 is provided in the usual manner with openings 32 for the teats.

The *modus operandi* of the above described arrangement is as follows:—After the machine is suspended from the cow in the usual manner, the teat plates 1, 2, 3 and 4 are moved forward toward the teats by means of the rod 25 which then is secured in its position by means of the arm 29, the nut 30 and the fork 31, whereupon the actuating shaft of the machine is rotated so that the milking members, which for example, may consist in known manner of oscillating arms 33, arranged in four groups shown in the drawings in dotted lines, are operated. The arms 33 first press the thicker teats against the corresponding plates, for example, those denoted by 1 and 3, these being moved and by means of the levers 7 and 8 and 9 and 10, moving forward the plates 2 and 4 until the thinner teats are pressed against these with a pressure which balances the pressure on the plates 1 and 3. Should it happen that the teats are not being compressed with sufficient pressure it is only necessary to move the rod 25 by means of the nut 30 in the same direction as in the former adjustment until the desired compression is obtained.

In the embodiment shown in Fig. 4 the levers 34, 35, 36, 37, which are intended to actuate the teat plates, are pivotally arranged on a shaft 38, which may, if desired, be the actuating shaft of the machine. The levers are formed as bell crank levers and may with their one ends engage in the teat plates in the same manner as the levers 7, 8, 9, 10 in Figs. 1 and 2, while their other ends are connected with the adjusting rod 39 in the manner hereinafter described. The two bell crank levers 34, 35 are connected by means of links 40 or 41 with the ends of a double armed lever 42. The bell crank levers 36, 37 are connected in the same manner by means of links 43, 44 with the ends of a double armed lever 45. The levers have in the middle an extended opening in which engages a pin 46 of oval form. One of these pins is secured in a link 47 which is pivotally connected with one end of a double armed lever 48, while the other pin 46 is connected by a link 49 with the other end of the same lever 48. The lever 48 has at its center an extended opening in which engages a pin 50 of oval form. This pin is secured in the adjusting rod 39. The *modus operandi* is as follows: When the teat plates connected with the levers 34, 35 are affected by different pressures the lever 42 swings about its pivot 46 until the pressures on the teat plates balance one another. In the same manner the lever 45 will swing about its pivot 46 when the pressures acting on the teat plates connected with the levers 37 and 38 are different. When the total pressures on the two levers 42, 45, are unequal, the lever 48 will move about its pivot 50 in the same manner as the link 22 in Fig. 2.

In the embodiment shown in Fig. 5 the arms 51, 52, 53, 54, which are to be connected with the teat plates are mounted on a common shaft 38. The hub portions of the two arms 51, 52, are connected with one another by a double armed lever 55, the pivot 56 of which is secured to an intermediate disk 57 rotatable on the shaft 38. In the same manner the hub portions of the two arms 53, 54, are connected with one another by a double armed lever 58, the pivot of which is secured to an intermediate disk 59 also rotatable on the shaft 38. The two intermediate disks 57 and 59 are connected with one another by a double armed lever 60, the pivot of which is secured to a third intermediate disk 61 which is provided with an arm 62 which may be connected with an adjusting device as for instance a movable rod arranged in the same manner as the rod 25 in Figs. 2 and 3. The pivots of the levers 55, 58 and 60 are of oval form and engage in extended openings in the levers so that the lengths of the arms of the latter are varied on rotating, in the manner described with reference to the diagram in Fig. 7. The *modus operandi* is as follows. When for example the teat plates connected with the arms 51 and 52 are subjected to unequal pressures the lever 55 rotates about its pivot 56 until equilibrium is established. The lever 60, in the same manner as the link 22 in Figs. 1 and 2 or the lever 48 in Fig. 4, takes up the total pressure acting on the four teat plates.

The embodiment shown in Fig. 6 differs from that shown in Fig. 5 only in the arrangement of the levers which connect the arms 51, 52, 53 and 54 in pairs. Instead of the levers 55 and 58 as shown in Fig. 5 a double armed lever 63 or 64 is arranged on the lower side of the arm 52 and on the upper side of the arm 54. The lever 63 connects the arms 51, 52 with one another and the pivot 65 of this lever is secured in an arm extending from the intermediate disk 57, while the arms 53 and 54 are connected with one another by the lever 64, the pivot 67 of which is secured in an arm 68 extending from the intermediate disk 59. The two intermediate disks 57 and 59 may be connected with one another in the same manner as in Fig. 5, that is, by a double armed lever, the pivot of which is secured in an intermediate disk 61 provided with an arm 62.

It is evident that a number of other forms may come within the invention. Those illustrated above, however, suffice to explain it.

Having now described my invention, what I claim as new and desire to secure by Letters Patent is:

1. A milking machine comprising adjustable plates, means for coöperating with said plates to compress teats, and means connected with the plates for moving one by the other, whereby when a thick teat is opposed to one plate and a thinner teat is opposed to the other plate the teats will be compressed with amounts of pressure corresponding to their thicknesses.

2. A milking machine comprising adjustable plates, means for coöperating with said plates to compress teats, means connecting the plates in pairs for moving one plate of each pair by the other plate of said pair, whereby when a thick teat is opposed to one plate of a pair and a thinner teat is opposed to the other plate of said pair the teats will be compressed with amounts of pressure corresponding to their thicknesses, and means connected with the plate-connecting means and through the medium of which the plates can be simultaneously moved into operative position and simultaneously moved out of operative position.

3. A milking machine comprising adjustable plates, means for coöperating with said plates to compress teats, and variable-leverage means connected with the plates for moving one by the other, whereby when a thick teat is opposed to one plate and a thinner teat is opposed to the other plate, the movement of one plate by the other will stop when the pressures on the two plates balance one another.

In testimony that I claim the foregoing as my invention, I have signed my name in presence of two subscribing witnesses.

DAVID ALFVÉN.

Witnesses:
 ENID DELMAR,
 JOHN DELMAR.